United States Patent [19]
Bruce et al.

[11] Patent Number: 4,506,553
[45] Date of Patent: Mar. 26, 1985

[54] APPARATUS FOR MEASURING SMALL VALUES OF AIR FLOW

[75] Inventors: Charles W. Bruce; Kenneth E. Kunkel; Fred C. Webb, all of Las Cruces, N. Mex.

[73] Assignee: The United States of America as represented by the Secretary of the Army, Washington, D.C.

[21] Appl. No.: 538,071

[22] Filed: Sep. 30, 1983

[51] Int. Cl.³ .......................... G01F 1/36; G01P 5/17
[52] U.S. Cl. .............................. 73/861.65; 73/189; 73/861.18
[58] Field of Search .......... 73/861.18, 861.65, 861.67, 73/861.68, 182, 189

[56] References Cited

U.S. PATENT DOCUMENTS 2,315,756  4/1943  Warner ........................... 73/861.65
3,386,287  6/1968  Hurvitz ........................... 73/861.71

FOREIGN PATENT DOCUMENTS 2911928  10/1980  Fed. Rep. of Germany ... 73/861.18
0396573  1/1974   U.S.S.R. ............................ 73/861.18

Primary Examiner—Charles A. Ruehl
Attorney, Agent, or Firm—Anthony T. Lane; Robert P. Gibson; Saul Elbaum

[57] ABSTRACT

A gas flow rotor cyclically connects a microphone to a dynamic flow pressure and then a reference static flow pressure. The microphone converts the pressures to a resultant alternating differential signal providing a first input to a phase-locked amplifier. A second amplifier input is derived from an optical pickup mounted on the rotor. Only the AC component of the converted microphone signal, which has a fixed phase relationship to that of the rotor, is amplified. A readout connected in circuit with the amplifier indicates the dynamic flow pressure.

10 Claims, 3 Drawing Figures

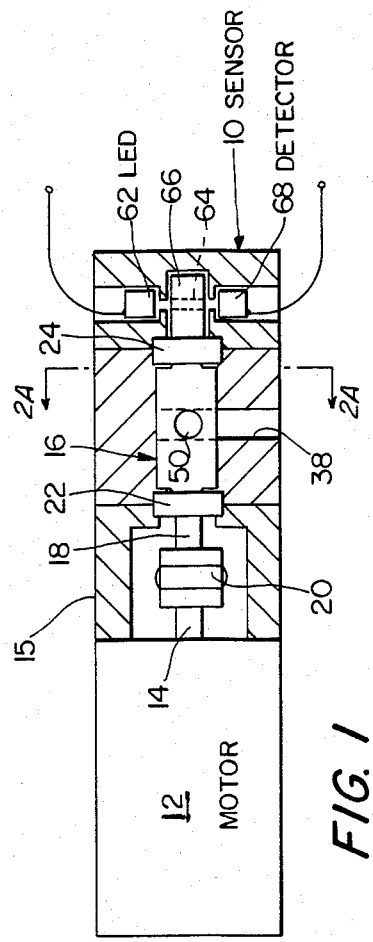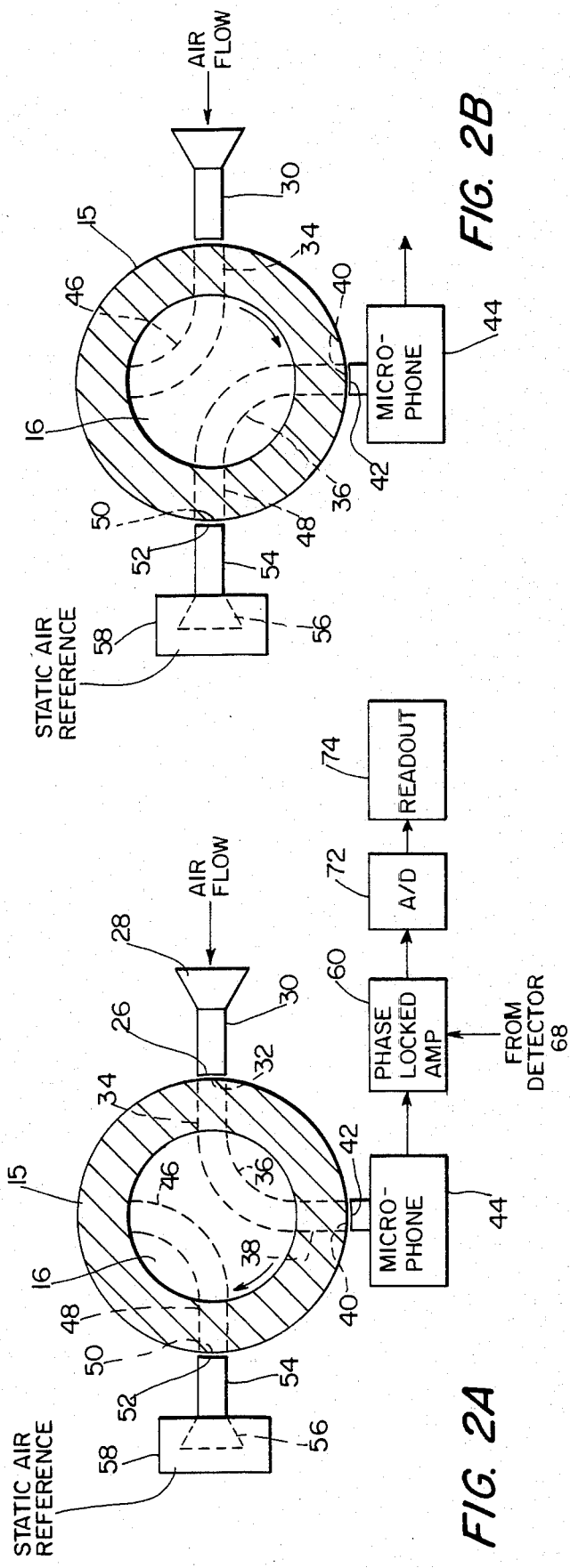

APPARATUS FOR MEASURING SMALL VALUES OF AIR FLOW

RIGHTS OF THE GOVERNMENT

The invention described herein may be manufactured, used, and licensed by or for the United States Government for governmental purposes without the payment to us of any royalty thereon.

FIELD OF THE INVENTION

The present invention relates to manometers and more particularly to a high sensitivity and fast response manometric air flow sensor.

BRIEF DESCRIPTION OF THE PRIOR ART

In a number of scientific applications, it is important to obtain accurate readings of very low and/or rapidly fluctuating air flow rates while retaining a large dynamic range. Unfortunately, conventional air flow sensors are neither sensitive to small flow rates nor do they have fast time response. Further, when used in meteorological applications, harsh environments exist which have hampered the design of a satisfactory instrument.

BRIEF DESCRIPTION OF THE PREFERRED INVENTION

The present invention has been designed for sensitivity to small flow rates with a fast response time while disturbing that low flow minimally. The present sensor measures the difference between a dynamic wind pressure at an orifice facing into the wind and a reference pressure. The reference pressure can be provided as a static pressure at a location shielded from the wind. By virtue of the present invention, measurements can be obtained at high speed so that both high sensitivity and fast response necessary for turbulence measurements may be had.

The present invention converts the aforementioned dynamic and static pressures to acoustical waves to be detected by a microphone which, with acoustical and electronic processing techniques, provides a very sensitive output. The conversion is implemented by mechanically alternating between two ports respectively connected to the dynamic pressure orifice and the reference pressure orifice. The resulting signal is an acoustical wave. The signal is then passed into a microphone and then processed electronically for a readout indication. The entire acoustical system is designed to obtain the requisite high sensitivity and time response. Sensitivity may be increased greatly by using phase-sensitive amplification of the electrical signal from the microphone. The previously mentioned mechanical switching between two ports is accomplished by utilizing a rotor with passages formed therethrough. A standard photo-optic rotor pickup detects the rotational rate and phase of the rotor which corresponds to the rotational rate and phase of electrical signals due to the acoustical signals picked up by the microphone. Utilizing the photo-detector output as a second input to the phase sensitive amplifier, amplification of only the AC component of the signal, which has a fixed phase relationship to that of the rotor, is processed. A readout is connected to the output of the amplifier for indicating flow rates with great sensitivity and fast response time.

The above-mentioned objects and advantages of the present invention will be more clearly understood when considered in conjunction with the accompanying drawings, in which:

BRIEF DESCRIPTION OF THE FIGURES

FIG. 1 is a cut-away view of the inventive sensor.

FIG. 2A is a cross sectional view taken along a plane passing through section line 2A—2A of FIG. 1 with the sensor rotor in position for measuring dynamic wind pressure.

FIG. 2B is a view similar to that of FIG. 2A but with the rotor displaced 90° for effective measurement of static pressure.

DETAILED DESCRIPTION OF THE INVENTION

Referring to the figures and more particularly FIG. 1 thereof, the apparatus of the present invention is seen to include a sensor 10 to which a motor 12 is mounted. The motor shaft 14 extends inwardly of the sensor housing 15 for connection to a rotor shaft 18 via a coupling 20, which may be a flexible coupling of conventional design. The rotor 16 is centrally located within housing 15 and is supported at its ends in bearings 22 and 24. The rotor acts as a flow switch as will be seen from the following description of FIG. 2A. A tube 30 is axially directed toward an air stream so that the sensor can measure the dynamic pressure caused by its flow. The dynamic pressure is convertible to an airflow rate using a known mathematical relationship. In a typical atmospheric environment, airflow rates, or their fluctuations, may be quite small. A pitot tube 28 serves as the simplest form of inlet while the opposite tube end 26 is an outlet for directing the flow into orifice 32 formed in the sensor housing. The orifice 32 communicates with radially oriented air passage 34 in the housing and in the position of rotor 16 as indicated in FIG. 2A, the curved air passageway 36 forms a conduit between air passage 34 and a second air passage 38 which is located 90° from the air passage 34. An orifice 40 is formed at the radially outward end of air passage 38 for registry with an orifice 42 formed in an enclosure for microphone 44. In the position illustrated in FIG. 2A, output will be discussed hereinafter.

FIG. 2B illustrates the position of rotor 16 when it has been rotated 90°. As will be observed, passageway 36 now communicates between orifice 40 and orifice 50. A second tube 54 is positioned in registry with orifice 50, the tube 54 communicating static pressure to the microphone 44. This is accomplished by inserting an outward end 56 of tube 54 in a shield with baffle 58. Thus, the static pressure condition in the shield 58 is communicated between the tube outlet 52, the air passage orifice 50 and passageway 36 to microphone 44. Thus, microphone 44 has sensed a net acoustical wave derived in first part from the air flow condition creating a dynamic pressure in tube 30, and in second part from the static air pressure in tube 54.

A second passageway 46 is seen to exist in rotor 16. The passageways may be likened to two oppositely directed elbow configurations. During the 90° rotation discussed in connection with FIGS. 2A and 2B, the second passageway 46 is inoperative. However, upon a further rotation of rotor 16 in a clockwise direction by 90° (not shown), the passageway 46 will serve to connect the air flow through tube 30 to microphone 44 once again, as in FIG. 2A. Then upon a further 90° displacement of rotor 16 (not shown), the second passageway 46 will connect the static air pressure in tube 54 to the microphone 44, as in FIG. 2B. Thus, microphone 44 alternately receives dynamic air flow data from tube 30 and static air reference data through tube 54, twice per complete rotation of rotor 16.

Referring back to FIG. 2A, the block diagram for electronic signal processing is seen to include a conventional phase-locked amplifier 60 having a first input connected to microphone 44. In order to provide rotor phase information to this amplifier, a conventional photo-optic pickup is mounted within housing 15 as will be seen in FIG. 1. Specifically, an LED 62 is positioned in optical alignment with a detector 68 which may be a silicon detector. Rotor extension 66 is axially disposed in the housing and in optical interference between the LED optical source 62 and detector 68. A bore 64 is formed along the diameter of the extension 66 so that detector 68 detects light from LED 62 twice during each full rotation of rotor 16. It is the electrical output from detector 68 which forms the second input of the amplifier 60 shown in FIG. 2A. The amplifier 60, of conventional design, amplifies only the AC component of the microphone signal which has a fixed phase relationship to that of the rotor. This increases the signal-to-noise ratio of the electrical processing considerably. The output of the phase-locked amplifier 60 may be connected to a conventional analog-to-digital converter 72 which in turn drives a digital readout 74 indicating the measurement of dynamic airflow presented at tube 30. Of course, in the event an analog meter is to be used, and A/D converter is unnecessary.

The signal processing exhibits a time response which is some fraction of rotor speed. In order to minimize the time response, one may eliminate the phase-locked amplifier and instead use a conventional peak detector, followed by a timed conversion to digital signals for direct input to a computer. In this case, although there is no diminishing of the time response, the signal-to-noise ratio would be lower.

The rotor described in the present invention may be machined in two halves with the air passageways 36 and 46 formed with a ball end mill so as to make perfectly smooth transitions as the rotor rotates.

Further, although the dynamic pressure port has been prestated as a pitot tube 28 and the static pressure reference port has been explained as utilizing a baffled port 58, orifices 56 and 28 may consist of similar and oppositely directed pairs of ports such as pitot tubes or holes in opposite sides of a sphere. This allows the magnitude of the wind component along the axis of the orifices 32 and 50 to be measured regardless of its sign. When the sign of the component changes, the designation of the orifices 32 and 50 also changes. The amplitude of the resulting output signal at microphone 44 is only dependent on the absolute value of the pressure difference (i.e., magnitude of the air flow component), not the sign. The sign information is contained in the phase of the wave signal. A change in sign of the pressure difference (i.e., the sign of the wind component) causes a 180° shift in the output wavefrom. One of the outputs of amplifier 60 is A cos θ where A is the amplitude and θ is the phase of the output signal. This allows both the magnitude and sign of the wind component to be easily measured using the amplifier 60.

Accordingly, the above-described invention offers apparatus for high sensitivity and fast response manometric air flow/pressure sensing where air flow rates (including very low flow rates) of wind or turbulence are to be measured.

It is emphasized that although the invention is described in terms of air flow measurements, it is equally applicable for other gases.

It should be understood that the invention is not limited to the exact details of construction shown and described herein for obvious modifications will occur to persons skilled in the art.

We claim:

1. A sensor for measuring gas flow comprising:
   a housing having
   (a) a first orifice for receiving dynamic gas flow therethrough,
   (b) a second orifice spaced from the first and communicating with a static gas or other reference environment,
   (c) a third orifice spaced from the other two and communicating with a microphone;
   rotor means located inwardly of the housing and having first and second curved passageways therein for alternately completing a passage between the third orifice, and the first then second orifices thus subjecting the microphone to a resultant acoustic wave dependent upon the dynamic gas flow.

2. The subject matter of claim 1 together with means mounted in the housing and adjacent the rotor means for photo-optically detecting the rotation of the rotor means.

3. The structure set forth in claim 2 together with a phase-locked amplifier having first and second inputs, said first input being connected to said microphone, and said second input being connected to the output of said photo-optic detecting means.

4. The subject matter set forth in claim 3 with indicating means connected in circuit with the output of the amplifier for displaying gas flow data.

5. A sensor for measuring air flow comprising:
   a housing having a first inlet;
   means for directing dynamic ambient air pressure to the inlet;
   an outlet in the housing spaced from the first inlet;
   a microphone located adjacent the outlet;
   rotor means located in the housing for connecting the first inlet and the outlet at a preselected position of the rotor means thereby subjecting the microphone to the dynamic ambient air pressure condition at the first inlet;
   a second inlet in the housing spaced from the first inlet;
   means connecting the second inlet with an external static or other airflow reference; and
   means rotating the rotor means to another position for causing the microphone to sense a second pressure condition corresponding to the airflow reference.

6. The subject matter set forth in claim 5 together with means mounted in the housing and adjacent the rotor means for photo-optically detecting the rotation of the rotor means.

7. The subject matter set forth in claim 6 further comprising a phase-locked amplifier having first and second inputs, said first input being connected to said microphone, and said second input being connected to the output of said photo-optic detecting means.

8. The subject matter set forth in claim 7 wherein the means rotating the rotor means comprises a motor coaxially mounted to the housing and having a shaft passing through the housing for connection to the rotor means.

9. The subject matter set forth in claim 8 together with means for changing a signal at the output of the amplifier to a digital signal.

10. The subject matter set forth in claim 9 together with display means connected to the changing means output for indicating values of measured dynamic air flow.

* * * * *